United States Patent Office 3,367,945
Patented Feb. 6, 1968

3,367,945
THIOUREA DERIVATIVES OF MITOMYCIN
Masanao Matsui, Tokyo, Izuru Yamamoto, Yokohama-shi, Yoshinori Soeda, Hiratsuka-shi, and Shigetoshi Wakaki, Tokyo, Japan, assignors to Kyowa Hakko Kogyo Co., Ltd., Tokyo, Japan, a corporation of Japan
Filed Dec. 1, 1965, Ser. No. 510,800
Claims priority, application Japan, May 18, 1965, 40/28,772
18 Claims. (Cl. 260—326.3)

The present invention relates to novel derivatives of mitomycin C, and more specifically to therapeutically useful 1a-thiourea derivatives of mitomycin C.

In 1956, mitomycin A and mitomycin B—compounds having anti-tumor potency as well as antibacterial activity—were isolated by Hata et al. from a culture medium of *Streptomyces caespitosus*. Subsequently, Wakagi et al. isolated mitomycin C from a culture medium of the same microorganism. It is known that mitomycin C, which also has anti-tumor and antibacterial activities, is one of the most potent of the known anti-tumor substances. However, its clinical utilization is restricted because of its relatively high toxicity. Thus, as is pointed out on page 687 of The Merck Index, Seventh Edition (1960), published by Merck & Co., Inc., Rahway, N.J., mitomycin C has been used primarily against for advanced malignancies.

The chemical structure of mitomycin C has recently been determined to correspond to the formula

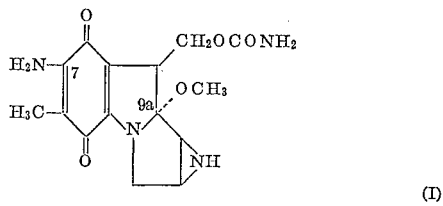

The compound can also be designated 7-amino-9a-methoxy-mitosane.

It is a desideratum in this art to embody new compounds which retain the advantages of mitomycin C, e.g. possess the antibacterial potencies thereof, but are free of the disadvantage thereof, i.e. are of such reduced toxicity relative to mitomycin as effectively to broaden the possibilities of use thereof.

The present invention realizes this desideratum by embodying novel 1a-thiourea derivatives of mitomycin C which are useful inter alia for the purposes for which the latter is used and in essentially the same way, but with elimination of the aspect of undue, and thereby prejudicial, toxicity.

The new compounds are prepared by reacting mitomycin C with an isocyanate (II), thereby to yield the objective 1a-thiourea derivative (III), according to the following reaction scheme:

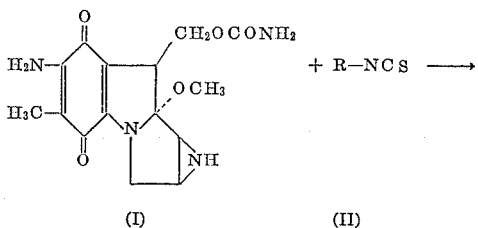

wherein R is alkyl with 1 to 6 carbon atoms (e.g. methyl, ethyl, n-propyl, isopropyl, n-butyl, isobutyl, pentyl, hexyl), cycloalkyl with 5 or 6 carbon atoms (cyclopentyl, cyclohexyl), phenyl, mononuclear carbocyclic aryl (phenyl, chlorophenyl, lower alkylphenyl such as methylphenyl and dimethylphenyl, phenyl(lower) alkyl such as benzyl, dichlorobenzyl, phenylethyl, etc.), binuclear carbocyclic aryl (α-naphthyl, β-naphthyl), etc.

The reaction of the above-indicated reaction scheme is advantageously effected in a medium which is a solvent for mitomycin C, e.g. dioxane, N,N-dimethylformamide, acetone, tetrahydrofurane, furane, etc., the isothiocyanate (II) being added to the solution of the mitomycin C in such solvent and the reaction being allowed to proceed at ambient temperature (e.g. about 20° to about 30° C.). A good yield of the objective 1a-thiourea derivative (III) is obtained in each case.

The new derivatives (III) show differences in infra-red absorption spectrum, ultraviolet absorption spectrum, and visible light absorption spectrum in comparison with mitomycin C and also different elementary analyses, as well as clearly different behaviors in column chromatography and thin layer chromatography, the results clearly evidencing the unitary character of the several substances.

Figure 1:
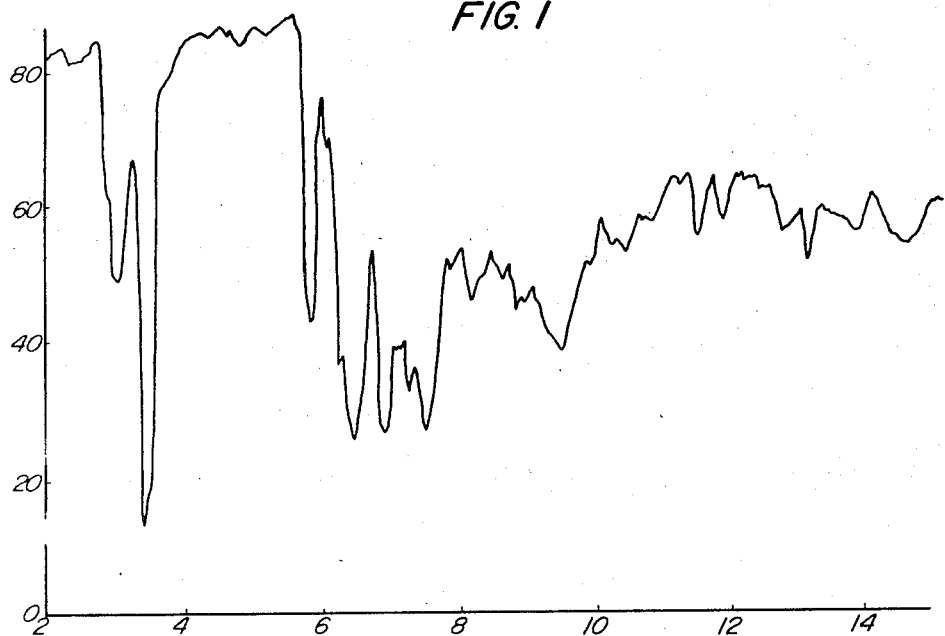
FIG. 1 shows the infra-red absorption spectrum of 1a-isobutyl-thiocarbamoyl mitomycin C (see Example 1 infra)
Figure 2:
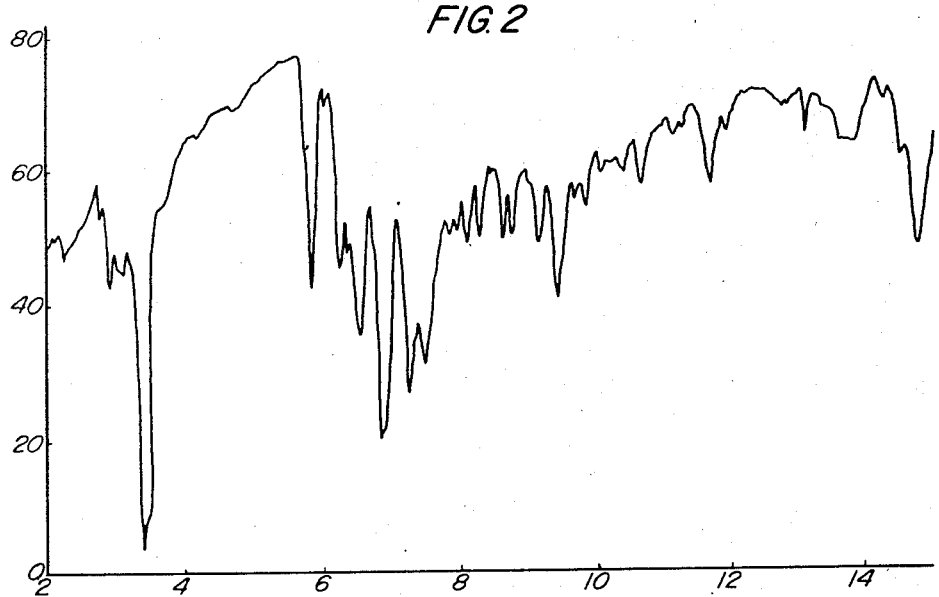
FIG. 2 shows the infra-red absorption spectrum of 1a-methyl-thiocarbamoyl mitomycin C (see Example 1 infra)
Figure 3:
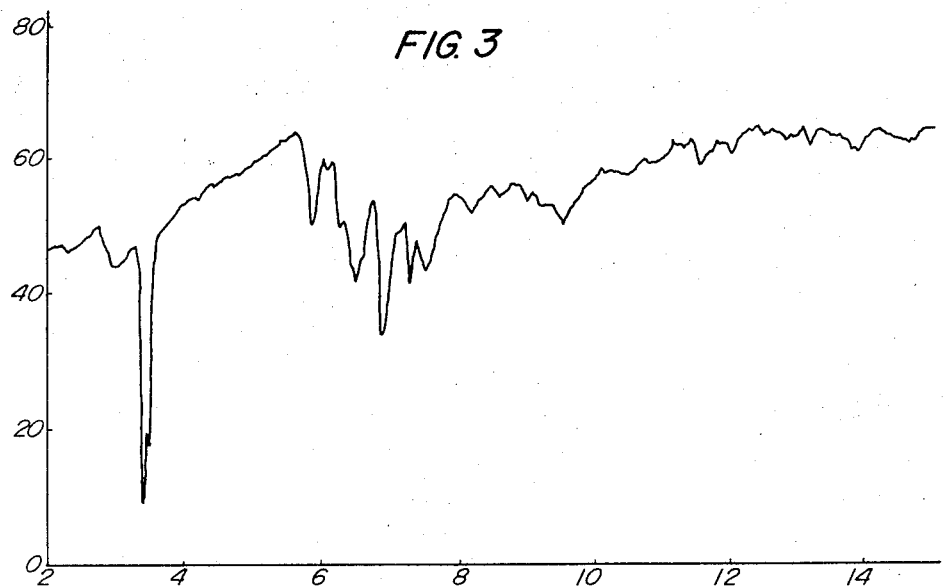
FIG. 3 shows the infra-red absorption spectrum of 1a-ethyl-thiocarbamoyl mitomycin S (see Example 3 infra)
Figure 4:
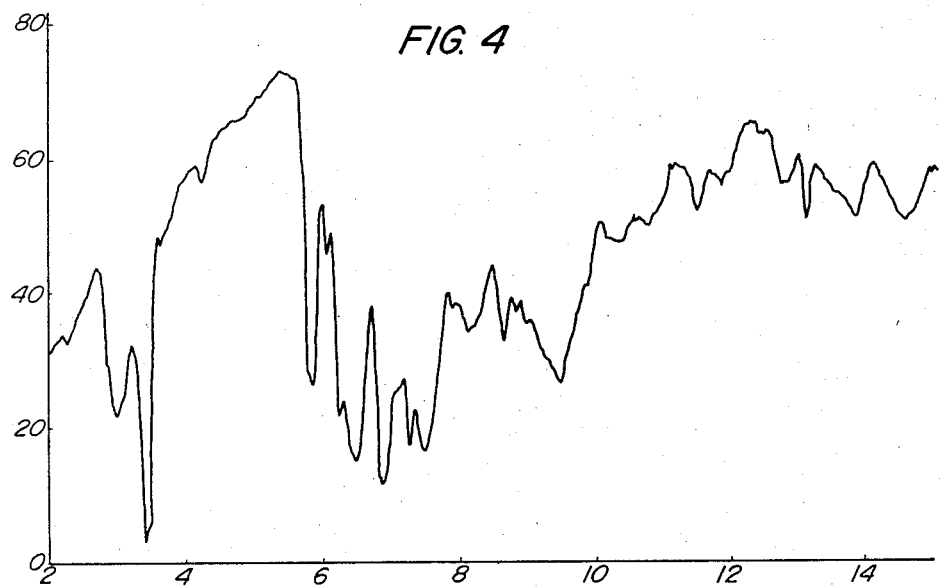
FIG. 4 shows the infra-red absorption spectrum of 1a-n-butyl-thiocarbamoyl mitomycin S (see Example 4 infra)
Figure 5:
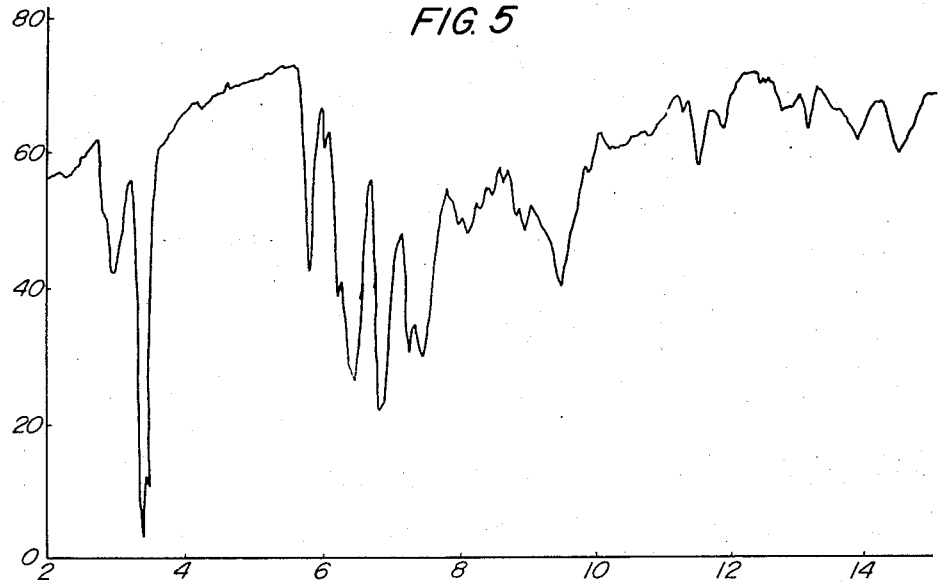
FIG. 5 shows the infra-red absorption spectrum of 1a-cyclohexyl-thiocarbamoyl mitomycin C (see Example 5 infra)
Figure 6:
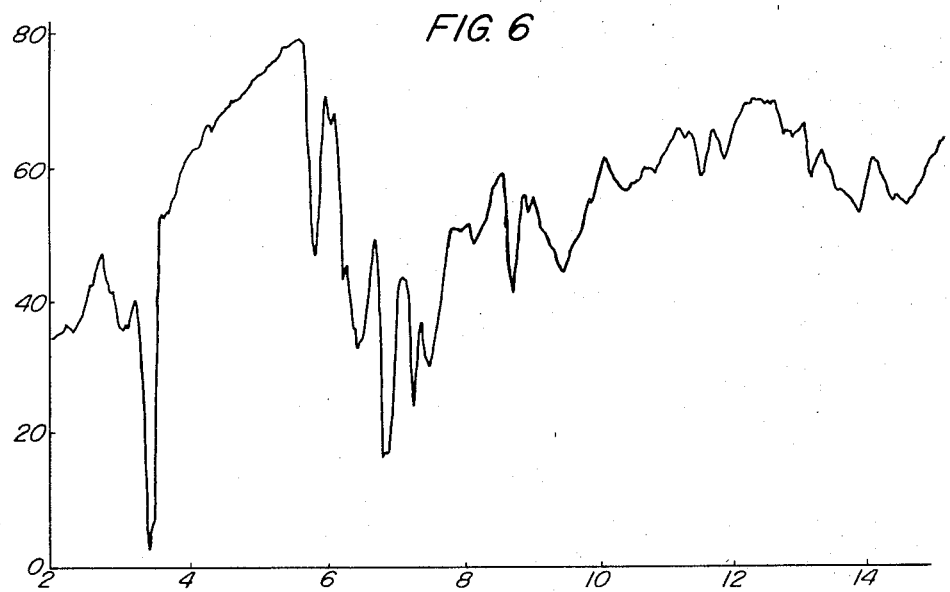
FIG. 6 shows the infra-red absorption spectrum of 1a-benzyl-thiocarbamoyl mitomycin C (see Example 6 infra)
Figure 7:
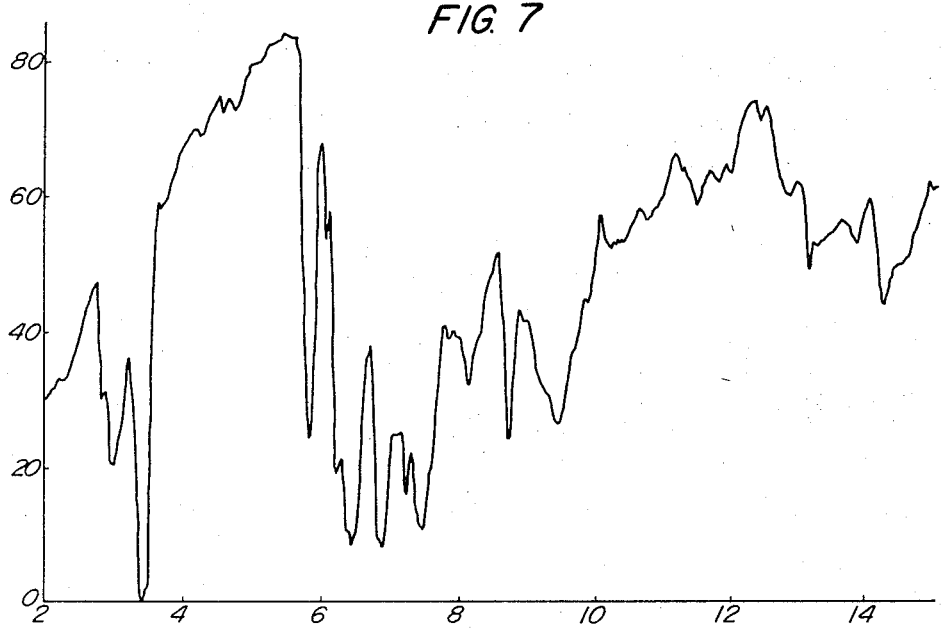
FIG. 7 shows the infra-red absorption spectrum of 1a-phenylethyl-thiocarbamoyl mitomycin C (see Example 12 infra)
Figure 8:
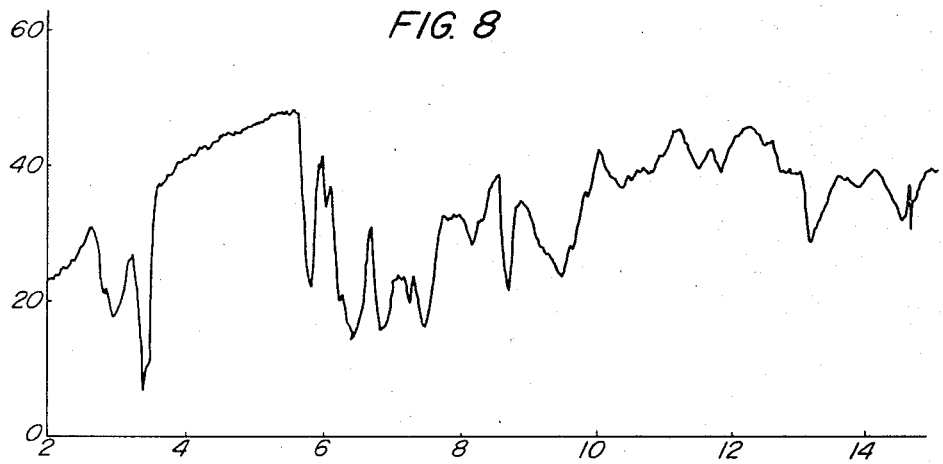
FIG. 8 shows the infra-red absorption spectrum of 1a-p-chlorobenzyl-thiocarbonyl mitomycin C (see Example 8 infra)
Figure 9:
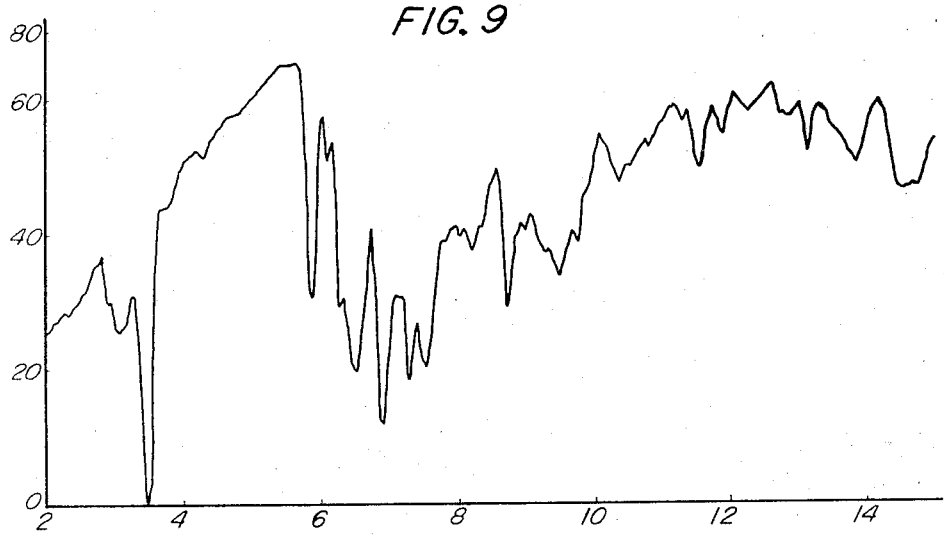
FIG. 9 shows the infra-red absorption spectrum of 1a-3,4-dichlorobenzyl-thiocarbamoyl mitomycin C (see Example 9 infra)
Figure 10:
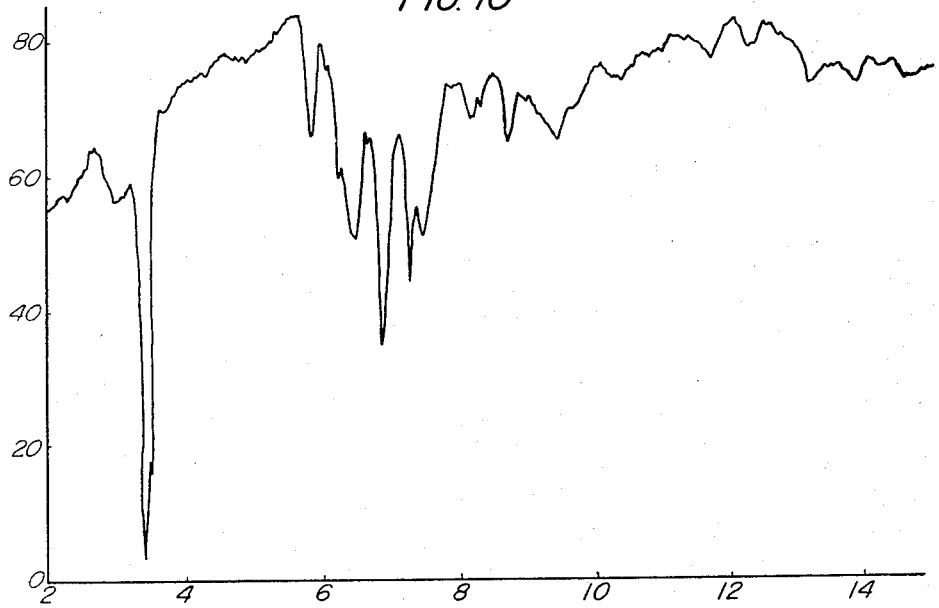
FIG. 10 shows the infra-red absorption spectrum of 1a-β-naphthyl-thiocarbamoyl mitomycin C (see Example 10 infra)
Figure 11:
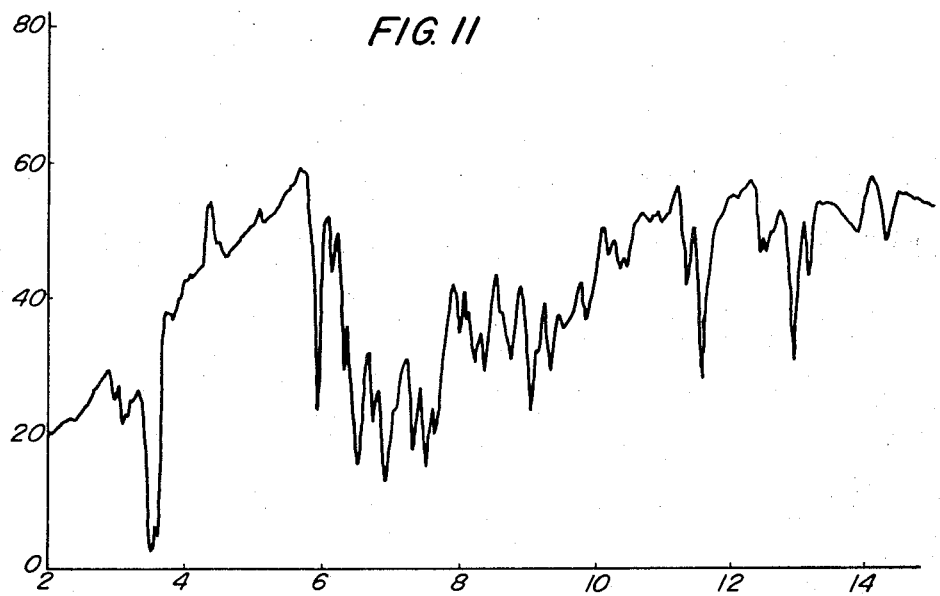
FIG. 11 shows the infra-red absorption spectrum of 1a-α-naphthyl-thiocarbamoyl mitomycin C (see Example 11 infra).

The following examples set forth, by way of illustration but not of limitation, presently preferred typical embodiments of the invention. In these examples, parts by weight bear the same relation to parts by volume as do grams to milliliters.

*Example 1*

880 parts by weight of mitomycin C are dissolved in 50 parts by volume of anhydrous dioxane in a receptacle of 100 parts by volume capacity. To the resultant solution, there is added a solution of 1520 parts by weight of isobutyl-isothiocyanate in 8 parts by volume of anhydrous dioxane, and the mixture is allowed to stand at room temperature (about 25° C.) for 48 hours after first thoroughly agitating and uniformly intermixing the same at the said temperature.

The resultant reaction mass (solution) is then concentrated to substantial dryness on a water bath at 55°–57° C. under reduced pressure, the obtained residue is dissolved in anhydrous dioxane, using only just enough of the latter to effect dissolution, and anhydrous benzene or n-hexane is added to precipitate the objective 1a-isobutyl-thiocarbamoyl mitomycin C, which is then isolated by filtration. The obtained substance is redissolved in anhydrous dioxane and again precipitated with anhydrous benzene or n-hexane, followed by filtration. The thus-obtained 1a-isobutyl-thiocarbamoyl mitomycin C is washed with anhydrous benzene or n-hexane, and then dried.

Recovery, 86%.
Molecular formula $C_{20}H_{27}O_5N_5S$; molecular weight 449.3.
Calculated values: C, 53.98%; H, 5.80%; N, 15.63%.
Analyzed values: C, 53.32%; H, 6.08%; N, 12.75%.
Ultraviolet and visible light absorption spectra:

$\lambda_{max.}^{MeOH}$ 215 m$\mu$ ($\epsilon$: 33200), 358 m$\mu$ ($\epsilon$: 19300), 560 m$\mu$ ($\epsilon$: 219).

*Example 2*

The procedure according to Example 1 is repeated mutatis mutandis, the isobutyl-isothiocyanate being replaced by the equivalent amount of methyl-isothiocyanate, whereby the obtained product is 1a-methyl-thiocarbamoyl mitomycin C.

Recovery, 86%.
Molecular formula $C_{17}H_{21}O_5N_5S$; molecular weight 407.3.
Calculated values: C, 59.11%; H, 4.92%; N, 17.24%.
Analyzed values: C, 53.31%; H, 5.22%; N, 13.59%.
Ultraviolet and visible light absorption spectra:

$\lambda_{max.}^{MeOH}$ 215 m$\mu$ ($\epsilon$: 24000), 256–7 m$\mu$ ($\epsilon$: 16000), 358–9 m$\mu$ ($\epsilon$: 16800), 550–60 m$\mu$ ($\epsilon$: 145).

*Example 3*

The procedure according to Example 1 is repeated mutatis mutandis, the isobutyl-isothiocyanate being replaced by the equivalent amount of ethyl-isothiocyanate, whereby the obtained product is 1a-ethyl-thiocarbamoyl mitomycin C.

Recovery, 98%.
Molecular formula $C_{18}H_{23}O_5N_5S$; molecular weight 421.3.
Calculated values: C, 51.43%; H, 5.23%; N, 16.67%.
Analyzed values: C, 51.61%; H, 6.22%; N, 13.15%.
Ultraviolet and visible light absorption spectra:

$\lambda_{max.}^{MeOH}$ 256–7 m$\mu$ ($\epsilon$: 15800), 358–9 m$\mu$ ($\epsilon$:19300).

*Example 4*

The procedure according to Example 1 is repeated mutatis mutandis, the isobutyl-isothiocyanate being replaced by the equivalent amount of n-butyl-isothiocyanate, whereby the obtained product is 1a-n-butyl-thiocarbamoyl mitomycin C.

Recovery, 75.3%.
Molecular formula $C_{20}H_{27}O_5N_5S$; molecular weight 449.3.
Calculated values: C, 53.58%; H, 5.80%; N, 15.80%; S, 7.15%.
Analyzed values: C, 53.38%; H, 6.52%; N, 13.31%; S, 6.65%.
Ultraviolet and visible light absorption spectra:

$\lambda_{max.}^{MeOH}$ 215 m$\mu$ ($\epsilon$: 31500), 256–7 m$\mu$ ($\epsilon$: 21200), 358–9 m$\mu$ ($\epsilon$: 25300), 550–60 m$\mu$ ($\epsilon$: 225).

*Example 5*

The procedure according to Example 1 is repeated mutatis mutandis, the isobutyl-isothiocyanate being replaced by the equivalent amount of cyclohexyl-isothiocyanate, whereby the obtained product is 1a-cyclohexyl-thiocarbamoyl mitomycin C.

Recovery, 88%.
Molecular formula $C_{22}H_{29}O_5N_5S$; molecular weight 475.3.
Calculated values: C, 55.70%; H, 5.90%; N, 14.77%.
Analyzed values: C, 55.20%; H, 6.34%; N, 12.90%.
Ultraviolet and visible light absorption spectra:

$\lambda_{max.}^{MeOH}$ 215 m$\mu$ ($\epsilon$: 32500), 256–7 m$\mu$ ($\epsilon$: 22000), 358–9 m$\mu$ ($\epsilon$: 22800), 550–60 m$\mu$ ($\epsilon$: 232).

*Example 6*

The procedure according to Example 1 is repeated mutatis mutandis, the isobutyl-isothiocyanate being replaced by the equivalent amount of benzyl-isothiocyanate, whereby the obtained product is 1a-benzyl-thiocarbamoyl mitomycin C.

Recovery, 78.7%.
Molecular formula $C_{23}H_{25}O_5N_5S$; molecular weight 483.4.
Calculated values: C, 57.27%; H, 4.98%; N, 14.52%.
Analyzed values: C, 56.35%; H, 5.40%; N, 11.90%.
Ultraviolet and visible light absorption spectra:

$\lambda_{max.}^{MeOH}$ 215 m$\mu$ ($\epsilon$: 52100), 358–9 m$\mu$ ($\epsilon$: 22600), 550–60 m$\mu$ ($\epsilon$: 231).

*Example 7*

The procedure according to Example 1 is repeated mutatis mutandis, the isobutyl-isothiocyanate being replaced by the equivalent amount of phenyl-isothiocyanate, whereby the obtained product is 1a-phenyl-thiocarbamoyl mitomycin C.

Recovery, 98.0%.
Molecular formula $C_{23}H_{23}O_5N_5S$; molecular weight 481.35.
Calculated values: C, 57.51%; H, 4.58%; N, 14.58%.
Analyzed values: C, 57.67%; H, 5.28%; N, 12.01%.
Ultraviolet and visible light absorption spectra:

$\lambda_{max.}^{MeOH}$ 215 m$\mu$ ($\epsilon$: 22700), 358–9 m$\mu$ ($\epsilon$: 20200), 550–60 m$\mu$ ($\epsilon$: 212).

*Example 8*

The procedure according to Example 1 is repeated mutatis mutandis, the isobutyl-isothiocyanate being replaced by the equivalent amount of p-chlorophenyl-isothiocyanate, whereby the obtained product is 1a-p-chlorophenyl thiocarbamoyl mitomycin C.

Recovery, 38.0%.
Molecular formula $C_{23}H_{22}O_5N_5SCl$; molecular weight 515.81.
Calculated values: C, 52.40%; H, 4.36%; N, 11.90%; Cl, 7.02%.
Analyzed values: C, 51.03%; H, 4.37%; N, 12.42%; Cl, 7.22%.
Ultraviolet and visible light absorption spectra:

$\lambda_{max.}^{MeOH}$ 215 m$\mu$ ($\epsilon$: 22100), 256-7 m$\mu$ ($\epsilon$: 14250), 358-9 m$\mu$ ($\epsilon$; 18000), 550-60 m$\mu$ ($\epsilon$: 240).

*Example 9*

The procedure according to Example 1 is repeated mutatis mutandis, the isobutyl-isothiocyanate being replaced by the equivalent amount of 3,4-dichlorobenzyl-isothiocyanate, whereby the obtained product is 1a-3,4-dichlorobenzyl-thiocarbamoyl mitomycin C.

Recovery, 80.0%.
Molecular formula $C_{23}H_{25}O_5N_5SCl_2$; molecular weight 554.3.
Calculated values: C, 49.93%; H, 4.34%; N, 12.66%; Cl, 12.82%.
Analyzed values: C, 49.11%; H, 3.89%; N, 12.95%.
Ultraviolet and visible light absorption spectra:

$\lambda_{max.}^{MeOH}$ 215 m$\mu$ ($\epsilon$: 45200), 256-7 m$\mu$ ($\epsilon$: 18000), 358-9 m$\mu$ ($\epsilon$: 19300), 550-60 m$\mu$ ($\epsilon$: 775).

*Example 10*

The procedure according to Example 1 is repeated mutatis mutandis, the isobutyl-isothiocyanate being replaced by the equivalent amount of $\beta$-naphthyl-isothiocyanate, whereby the obtained product is 1a-$\beta$-naphthyl-thiocarbamoyl mitomycin C.

Recovery, 90.0%.
Molecular formula $C_{26}H_{25}O_5N_5S$; molecular weight 518.6.
Calculated values: C, 60.25%; H, 4.63%; N, 13.51%.
Analyzed values: C, 59.15%; H, 5.61%; N, 10.72%.
Ultraviolet and visible light absorption spectra:

$\lambda_{max.}^{MeOH}$ 215 m$\mu$ ($\epsilon$: 64800), 256-7 m$\mu$ ($\epsilon$: 13500), 358-9 m$\mu$ ($\epsilon$: 23200), 550-60 m$\mu$ ($\epsilon$: 238).

*Example 11*

The procedure according to Example 1 is repeated mutatis mutandis, the isobutyl-isothiocyanate being replaced by the equivalent amount of $\alpha$-naphthyl-isothiocyanate, whereby the obtained product is 1a-$\alpha$-naphthyl-thiocarbamoyl mitomycin C.

Recovery, 90.0%.
Molecular formula $C_{26}H_{26}O_5N_5S$; molecular weight 518.6.
Calculated values: C, 60.25%; H, 4.63%; N, 13.51%.
Analyzed values: C, 59.46%; H, 5.65%; N, 11.56%.
Ultraviolet and visible light absorption spectra:

$\lambda_{max.}^{MeOH}$ 215 m$\mu$ ($\epsilon$: 71600), 258-9 m$\mu$ ($\epsilon$: 18200), 550-60 m$\mu$ ($\epsilon$: 217).

*Example 12*

The procedure according to Example 1 is repeated mutatis mutandis, the isobutyl-isothiocyanate being replaced by the equivalent amount of phenylethyl-isothiocyanate, whereby the obtained product is 1a-phenylethyl thiocarbamoyl mitomycin C.

Recovery, 97.0%.
Molecular formula $C_{24}H_{27}O_5N_5S$; molecular weight 497.4.
Calculated values: C, 58.07%; H, 5.44%; N, 14.11%.
Analyzed values: C, 58.71%; H, 5.34%; N, 12.85%; S, 6.45%.

Ultraviolet and visible light absorption spectra:

$\lambda_{max.}^{MeOH}$ 256-7 m$\mu$ ($\epsilon$: 14500), 358-9 m$\mu$ ($\epsilon$: 21600), 550-60 m$\mu$ ($\epsilon$: 545).

*Example 13*

The procedure according to Example 1 is repeated mutatis mutandis, the isobutyl-isothiocyanate being replaced by the equivalent amount of 2,4-dimethylphenyl-isothiocyanate, whereby the obtained product is 1a-2,4-dimethyl-thiocarbamoyl mitomycin C.

Recovery, 80.0%.
Molecular formula $C_{23}H_{27}O_5N_5S$; molecular weight 509.37.
Calculated values: C, 59.06%; H, 5.11%; N, 13.78%.
Analyzed values: C, 60.87%; H, 5.99%; N, 10.98%.

*Example 14*

The procedure according to Example 1 is repeated mutatis mutandis, the isobutyl-isothiocyanate being replaced by the equivalent amount of 3-(o-methylphenyl)-propyl isothiocyanate, whereby the obtained product is 1a-3-(o - methylphenyl) - propyl - thiocarbamoyl mitomycin C.

Recovery, 88.0%.
Molecular formula $C_{26}H_{32}O_5N_5S$; molecular weight 526.58.
Calculated values: C, 59.45%; H, 5.90%; N, 13.33%.
Analyzed values: C, 59.12%; H, 6.38%; N, 11.92%.
Ultraviolet and visible light absorption spectra:

$\lambda_{max.}^{MeOH}$ 215 m$\mu$ ($\epsilon$: 22100), 256-7 m$\mu$ ($\epsilon$: 14250), 358-9 m$\mu$ ($\epsilon$: 18000), 550-60 m$\mu$ ($\epsilon$: 240).

The toxicities of the 1a-thiourea derivatives (III) of the present invention are reduced and are as follows in comparison with that of mitomycin C:

TABLE 1

| Derivatives: | LD 50 (mg./kg.) (mouse) |
|---|---|
| Mitomycin C | 9 |
| 1a-isobutyl-thiocarbamoyl mitomycin C | >200 |
| 1a-methyl-thiocarbamoyl mitomycin C | 200 |
| 1a-ethyl-thiocarbamoyl mitomycin C | 150 |
| 1a-n-butyl-thiocarbamoyl mitomycin C | 150 |
| 1a-cyclohexyl-thiocarbamoyl mitomycin C | 150 |
| 1a-benzyl-thiocarbamoyl mitomycin C | 300 |
| 1a-phenylethyl-thiocarbamoyl mitomycin C | 139.5 |
| 1a-3,4-dichlorobenzyl-thiocarbamoyl mitomycin C | 300 |
| 1a-$\beta$-naphthyl-thiocarbamoyl mitomycin C | 139.5 |
| 1a-$\alpha$-naphthyl-thiocarbamoyl mitomycin C | 200 |

The minimum inhibiting concentrations of these derivatives against various kinds of bacilli examined by the agar plate culture method are as shown in Table 2:

TABLE 2

The minimum inhibiting concentration (mcg./ml.) (mcg./ml.=micrograms per milliliter) of

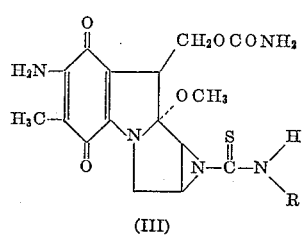

(III)

against various kinds of bacilli:

TABLE 2—Continued

| Name of Substance | 1a-isobutyl-thiocarbamoyl mitomycin C | 1a-methyl thiocarbamoyl mitomycin C | 1a-ethyl thiocarbamoyl mitomycin C |
|---|---|---|---|
| *Staphylococcus aureus* | 3.12 | 1.56 | 6.25 |
| *Sarcina lutea* | 12.5 | 6.25 | 12.5 |
| *Bacillus subtilis* | 12.5 | 3.12 | 6.25 |
| *Salmonella typi* | >50 | 50 | >50 |
| *Shigella flexneri* | >50 | 50 | >50 |
| *Klebsiella pneumoniae* | >50 | >50 | >50 |
| *Proteus vulgaris* | >50 | >50 | >50 |
| *Escherichia coli* | >50 | >50 | >50 |
| *Bacillus pyocyaneous* | >50 | >50 | >50 |
| *Vibrio comma* | 1.56 | 0.78 | 1.56 |
| *Mycobacterium tuberculosis* | 12.5 | 6.25 | 6.25 |
| *Streptococcus haemolyticus* | 12.5 | 6.25 | 1.56 |
| *Streptococcus faecalis* | 12.5 | 12.5 | 6.25 |
| *Diplococcus pneumoniae* | 0.195 | 0.195 | 0.097 |
| *Corynebacterium diphtheriae* | 3.12 | 6.25 | 1.56 |

| Name of Substance | 1a-n-butyl thiocarbamoyl mitomycin C | 1a-cyclohexyl thiocarbamoyl mitomycin C | 1a-benzyl thiocarbamoyl mitomycin C |
|---|---|---|---|
| *Staphylococcus aureus* | 1.56 | 3.12 | 3.12 |
| *Sarcina lutea* | 3.12 | 6.25 | 6.25 |
| *Bacillus subtilis* | 1.56 | 3.12 | 6.25 |
| *Salmonella typi* | 25 | 25 | >50 |
| *Shigella flexneri* | 25 | 50 | >50 |
| *Klebsiella pneumoniae* | 50 | >50 | >50 |
| *Proteus vulgaris* | 50 | 50 | >50 |
| *Escherichia coli* | 25 | 50 | >50 |
| *Bacillus pyocyaneus* | >50 | >50 | >50 |
| *Vibrio comma* | 0.39 | 0.39 | 1.56 |
| *Mycobacterium tuberculosis* | 3.12 | 3.12 | 12.5 |
| *Streptococcus haemolyticus* | 1.56 | 1.56 | 1.56 |
| *Streptococcus faecalis* | 3.12 | 6.25 | 6.25 |
| *Diplococcus pneumoniae* | 0.097 | 0.195 | 0.195 |
| *Corynebacterium diphtheriae* | 1.56 | 0.78 | 6.25 |

| Name of Substance | 1a-phenylethyl thiocarbamoyl mitomycin C | 1a-3,4-di-chlorobenzyl thiocarbamoyl mitomycin C |
|---|---|---|
| *Staphlococcus aureus* | 0.78 | 1.56 |
| *Sarcina lutea* | 0.39 | 1.56 |
| *Bacillus subtilis* | 0.78 | 3.12 |
| *Salmonella typi* | 12.5 | >50 |
| *Shigella flexneri* | 6.25 | >50 |
| *Klebsiella pneumoniae* | 25 | >50 |
| *Proteus vulgaris* | 12.5 | >50 |
| *Escherichia coli* | 12.5 | >50 |
| *Bacillus pyocyaneus* | 12.5 | >50 |
| *Vibrio comma* | 0.097 | 12.5 |
| *Mycobacterium tuberculosis* | 0.39 | 6.25 |
| *Streptococcus haemolyticus* | 0.39 | 1.56 |
| *Streptococcus faecalis* | 1.56 | 50 |
| *Diplococcus pneumoniae* | 0.048 | 0.39 |
| *Corynebacterium diphtheriae* | 0.39 | 1.56 |

| Name of Substance | 1a-β-naphthyl thiocarbamoyl mitomycin C | 1a-α-naphthyl thiocarbamoyl mitomycin C |
|---|---|---|
| *Staphylococcus aureus* | 0.78 | 0.78 |
| *Sarcina lutea* | 0.78 | 0.78 |
| *Bacillus subtilis* | 0.78 | 0.78 |
| *Salmonella typi* | 3.12 | 3.12 |
| *Shigella flexneri* | 12.5 | 3.12 |
| *Klebsiella pneumoniae* | 12.5 | 12.5 |
| *Proteus vulgaris* | 12.5 | 12.5 |
| *Escherichia coli* | 6.25 | 6.25 |
| *Bacillus pyocyaneus* | 50 | 25 |
| *Vibrio comma* | 0.097 | 0.097 |
| *Mycobacterium tuberculosis* | 0.78 | 0.78 |
| *Streptococcus haemolyticus* | 0.39 | 0.79 |
| *Streptococcus faecalis* | 1.56 | 1.56 |
| *Diplococcus pneumoniae* | 0.024 | 0.048 |
| *Corynebacterium diphtheriae* | 0.39 | 0.195 |

Like mitomycin C itself, the new 1a-thiourea derivatives (III) of the present invention are useful in vitro as antiseptics, i.e. for disinfecting; and are also useful in combating topical infections due to pathogenic bacteria, e.g. in cases of staphylodermatitis and the like, and in this connection they may be applied topically or administered internally (e.g. orally).

Examples of formulations—solely illustrative and not at all limitative—using the compounds (III) are as follows:

*Example 15*

One gram of 1a-isobutyl-thiocarbamoyl mitomycin C is homogeneously incorporated into about 500 grams of an ointment base (Vaseline). Repeated application of the thus-prepared ointment to topical infections due to *Staphylococcus aureus* exhibits a curative effect.

The Vaseline may be replaced by any other suitable and desired base, e.g. a vanishing cream base. The 1a-isobutyl-thiocarbamoyl mitomycin C may be replaced by any other of the compounds III of this invention with like effect.

*Example 16*

Powder form 1a-isobutyl-thiocarbamoyl mitomycin C scattered lightly over raw fish is found to inhibit putrefaction of the latter so that it remains fresh for a relatively long period of time. Any of the other compounds III of this invention, similarly employed, exhibits a like action.

What is claimed is:

1. A compound of the formula 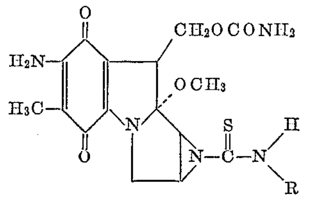 wherein R is a member selected from the group consisting of alkyl with 1 to 6 carbon atoms, cycloalkyl containing 5 to 6 carbon atoms, phenyl, chlorine-substituted phenyl, lower alkylphenyl, phenyl(lower)alkyl, chlorine-substituted phenyl(lower)alkyl and naphthyl.

2. A compound according to claim 1, namely, 1a-lower alkyl-thiocarbamoyl mitomycin C.

3. A compound according to claim 1, namely, 1a-isobutyl-thiocarbamoyl mitomycin C.

4. A compound according to claim 1, namely, 1a-methyl-thiocarbamoyl mitomycin C.

5. A compound according to claim 1, namely, 1a-ethyl-thiocarbamoyl mitomycin C.

6. A compound according to claim 1, namely, 1a-n-butyl-thiocarbamoyl mitomycin C.

7. A compound according to claim 1, namely, 1a-cyclopentyl-thiocarbamoyl mitomycin C.

8. A compound according to claim 1, namely, 1a-cyclohexyl-thiocarbamoyl mitomycin C.

9. A compound according to claim 1, namely, 1a-phenyl(lower)alkyl-thiocarbamoyl mitomycin C.

10. A compound according to claim 1, namely, 1a-benzyl-thiocarbamoyl mitomycin C.

11. A compound according to claim 1, namely, 1a-phenylethyl-thiocarbamoyl mitomycin C.

12. A compound according to claim 1, namely, 1a-phenyl-thiocarbamoyl mitomycin C.

13. A compound according to claim 1, namely, 1a-2,4-dimethylphenyl-thiocarbamoyl mitomycin C.

14. A compound according to claim 1, namely, 1a-3-(o-methylphenyl)-propyl-thiocarbamoyl mitomycin C.

15. A compound according to claim 1, namely, 1a-p-chlorophenyl-thiocarbamoyl mitomycin C.

16. A compound according to claim 1, namely, 1a-β-naphthyl-thiocarbamoyl mitomycin C.

17. A compound according to claim 1, namely 1a-α-naphthyl-thiocarbamoyl mitomycin C.

18. A compound according to claim 1, namely, 1a-3,4-dichlorobenzyl-thiocarbamoyl mitomycin C.

References Cited

UNITED STATES PATENTS 3,226,393 12/1965 Meyer et al. ---------- 260—295

OTHER REFERENCES

Burger: Medicinal Chemistry (2nd ed.) (1960), pp. 1134–35.

ALEX MAZEL, *Primary Examiner.*

J. A. NARCAVAGE, *Assistant Examiner.*